3,024,118
CERAMOPLASTIC MATERIAL
Philip S. Hessinger, West Caldwell, N.J., and Wolfgang K. Haller, Washington, D.C., assignors to Mycalex Corporation of America, Clifton, N.J., a corporation of New York
No Drawing. Filed Oct. 1, 1958, Ser. No. 764,515
13 Claims. (Cl. 106—39)

This invention relates to a new and improved method of making vitreo-micaceous materials and particularly to a new and improved method for making ceramoplastic materials such as, for instance, synthetic mica bonded with glass.

With the discovery of practical methods of manufacturing synthetic mica, new and improved vitreo-micaceous materials have been developed which incorporate synthetic mica therein. These materials are known in the art as ceramoplastics. Many of the new ceramoplastic materials are made of synthetic fluor-phlogopite mica bonded with a glass, the glass preferably being a low melting glass such as, for instance, lead borate, lead borosilicate, barium borate or barium borosilicate. The usual method now used for manufacturing ceramoplastic of the type mentioned hereinbefore is to powder synthetic fluor-phlogopite mica made by the now standard internal resistance melting method, and mix it with powdered frit, thereafter heating the mixture to a temperature for softening the frit and thereafter introducing the heated mixture into a mold and pressing said material while the material cools. Such a ceramoplastic material has superior electrical and mechanical properties which have made it unique in the electrical and thermal insulating fields.

Although the method hereinbefore briefly described yields an excellent ceramoplastic insulating material, we have found that a more homogeneous material having more uniform crystals of mica and much higher thermal endurance can be provided by the method embodying the present invention. By providing a ceramoplastic with a more homogeneous distribution of the mica in the glass binder and a more uniform and controlled mica crystal size, the control of the quality of the material may be more precise and the electrical and mechanical properties thereof may also be markedly improved.

In U.S. patent application, Serial No. 681,431, filed by Robert E. Moore on September 3, 1957, for Method of Recrystallizing Synthetic Mica and in U.S. patent application, Serial No. 681,432, filed by Robert E. Moore on September 3, 1957, for Method of Making Synthetic Mica, there is disclosed and claimed a method of producing synthetic mica from solutions of lead borate glasses and other vitreous materials. In these applications it is disclosed that when the solution becomes saturated mica will precipitate out of the solution.

It is therefore one object of the present invention to provide a new and improved method of making ceramoplastic materials.

Another object of the present invention is the provision of a method of making improved ceramoplastic materials.

The above and other objects, characteristics and features of the present invention will be more fully understood from the following description.

As stated hereinbefore, the present invention is based on aforementioned Moore applications. Broadly, these applications disclose that when micaceous material or raw materials which are stoichiometrically equivalent to micaceous are added to molten lead borate, they will dissolve therein and when the solution is cooled, micaceous material will precipitate out of the solution. The invention finds its greatest use in connection with non-hydroxyl micas, that is mica in which the hydroxyl ions have been substituted for, and particularly fluor-micas such as, for instance, normal fluor-phlogopite mica having the chemical formula $KMg_3AlSi_3O_{10}F_2$ and taeniolite having the formula $KMg_2LiSi_4O_{10}F_2$. The solvent for the mica or raw materials which are stoichiometrically equivalent thereto may be any vitreous material which has the property of dissolving mica and then permitting the mica to crystallize therefrom. The best vitreous solvent discovered to date is lead borate and particularly lead borate composed essentially of from 50% to 92% oxide (PbO) and from 50% to 8% boron trioxide ($B_2O_3$). The most desirable formulation for the lead borate solvent is composed essentially of from 81.6 PbO and 18.4% $B_2O_3$.

A lead borate glass in the form of a frit having the formulation described above may be made by standard commercial techniques. In lieu of the lead borate, raw lead oxide and boron trioxide in the same proportions may be used. The frit (or raw PbO and $B_2O_3$) is preferably ground to a fine particle size such as, for instance, 200 mesh and is mixed with micaceous material or raw materials stoichiometrically equivalent thereto. For instance, ground normal fluor-phlogopite mica or taeniolite mica may be mixed with the frit. In lieu thereof, ground raw materials stoichiometrically equivalent to normal fluor-phlogopite mica or taeniolite mica may be mixed with the frit. One combination of raw materials to yield normal fluor-phlogopite mica is:

| | Percent |
|---|---|
| Potassium silico fluoride ($K_2SiF_6$) | 19.77 |
| Potash feldspart ($KAlSi_3O_8$) | 18.47 |
| Silica ($SiO_2$) | 24.26 |
| Alumina ($Al_2O_3$) | 8.95 |
| Magnesia (MgO) | 28.55 |

One combination of raw materials to yield taeniolite mica is:

| | Percent |
|---|---|
| Potassium silico fluoride ($K_2SiF_6$) | 9.8 |
| Silica ($SiO_2$) | 38.1 |
| Lithium fluoride (LiF) | 6.4 |
| Potassium silicate ($1K_2O \cdot 3.87SiO_2$) | 25.8 |
| Magnesium oxide (MgO) | 19.9 |

In determining the proportions of raw materials which constitute the mica producing material if raw materials are used in lieu of mica, it must be borne in mind that upon heating the raw materials to dissolve them in the glass forming materials there may be some loss of fluorine and potassium. Accordingly, it will be necessary to adjust the raw batch for these losses so that the raw batch is stoichiometrically equivalent to mica at the smelting temperature.

Throughout this specification the term "glass forming material" is intended to mean glass and raw materials which combine to form glass, and the term "mica forming material" is intended to mean mica raw materials which are stoichiometrically equivalent to mica and which will combine to form mica.

In accordance with the preferred embodiment of our invention, raw materials which will form a lead borate glass are smelted with raw materials which will form a fluor-mica such as a fluor-phlogopite mica and preferably a normal fluor-phlogopite mica having the formula $KMg_3AlSi_3O_{10}F_2$. Although the smelting can take place at temperatures between 450° C. and 1365° C., it is preferred to carry out the smelting at temperatures between about 800° C. and 1200° C. The ratio by weight of mica forming material (raw batch) and glass forming material used as the charge for the smelter depends upon the smelting temperature. This dependency is due to the fact that as the smelting temperature increases, the solubility of the mica forming material in the glass forming material increases. For instance, if the mixture is smelted at 800° C., 20% of the mixture may be constituted of mica forming material and all 20% will dissolve at said temperature; at 1150° C., approximately 30% of the smelter charge may be mica forming material and at 1200° C., approximately 40% of the charge may be mica forming material. In the present invention, it is preferred to smelt the charge at 1200° C. Accordingly, the lead oxide and boron trioxide mixture will constitute about 60% of the smelter charge and the raw batch materials which will react to form the mica will form about 40% of the charge. As already stated above, the glass forming materials should consist essentially of about from 50% to 92% lead oxide and from 50% to 8% boron trioxide and the preferred composition is 81.6% PbO and 18.4% $B_2O_3$. The composition of the raw mica batch has been set forth above and will together comprise about 40% of the charge.

The glass forming material and mica raw batch material are introduced into a smelter which has been preferably preheated to a temperature of about 1250°. The batch upon being introduced tends to reduce the temperature of the smelter to about 1200° C. and this temperature is maintained by any suitable heating means such as gas burners. The batch is maintained at the temperature of 1200° C. for sufficient time to cause a completely molten material to be present in the smelter which time will be about 20 to 30 minutes at 1200° C. for a 75 pound batch. After complete dissolution occurs, the molten material is poured from the smelter into a quenching tank having suitable quenching material such as water. The rapid quench will prevent any mica from precipitating out of the glass and the resulting quenched product will therefore be a clear glass frit.

The frit is then placed in an oven to be dried, preferably at a temperature of about 120° C. The dried frit is then ground as in a ball mill and after the grinding is completed, the ground frit is screened to remove the coarser material such as, for instance, that material which will not pass through a 200 mesh screen. The coarse material is sent back for regrinding and the fine material is ready for further treatment to ultimately form our novel ceramoplastic.

In forming the ceramoplastic material preferably the finely ground frit is mixed with ground mica and most preferably with micronized ground mica, that is mica which has been ground to a grain size of about two to ten microns and preferably about five microns. In the preferred embodiment of the invention, the micronized mica addition is of the same composition as the mica dissolved in the ground frit. The amount of micronized mica added to the frit may make up anywhere from 5% to 90% of the mixture by weight with 10% micronized mica by weight being preferred. The frit and mica addition are thoroughly mixed and then a temporary binder such as water is added up to about 10% by weight with a 7% water addition being preferred. The mixture of the mica, frit and water is then cold-pressed into a preform at pressures between about 2,000 and 10,000 pounds per square inch, 3,000 pounds per square inch being the preferred pressure. The preform is then placed in an oven to bake at approximately 120° C. to drive off all of the water contained therein. Thereafter, the dried preform is fired at temperatures between about 800° C. and 1100° C. and preferably at a temperature of about 980° C. for sufficient time to achieve thermochemical equilibrium. In firing, it is preferred to gradually heat the preform to the firing temperature at a rate of the order of 150° C. per hour, thereafter maintaining the preform at the firing temperature until thermochemical equilibrium is obtained, and thereafter, gradually cooling the preform at a rate of the order of 150° C. per hour in order to prevent any thermal stresses being set up in the ceramoplastic. During the firing, the mica which is dissolved in the frit precipitates therefrom to yield a material with precipitated mica dispersed therethroughout and bonded by the lead borate glass formed by the lead oxide and boron trioxide. This lead borate glass may be slightly modified in the event that all of the mica dissolved therein is not precipitated therefrom. The micronized mica addition is believed to work as a nucleating agent and thus fosters the precipitation of the mica from the glass. Naturally, it also serves to raise the mica content of the final product.

The finished product after cooling may be subjected to a surface grinding operating and thereafter constitutes a machinable ceramoplastic having excellent electrical and thermal properties. For instance, the dielectric constant of the preferred material is 7.4 and the dissipation factor is .001 at 1 megacycle. The volume resistivity of the preferred material is $5 \times 10^{14}$ ohm-centimeters at room temperature and $10^7$ ohm-centimeters at 500° C.

In lieu of using raw materials to form the glass and to form the mica, the starting materials which may be introduced into the smelter may be composed in whole or in part of a fritted lead borate glass made up of from 50% to 92% PbO and from 50% to 8% $B_2O_3$ and mica such as a fluor-mica and more particularly a fluor-phlogopite mica, preferably normal fluor-phlogopite mica. The temperatures, ranges of composition, percentage of addition of micronized mica, etc. are the same as would be used when raw batch materials are used to form the mica and the glass. Furthermore, as starting materials for the smelting operation, mica may be mixed with raw PbO and $B_2O_3$ in the previously stated proportions and the process will thereafter be the same, or a previously fritted lead borate glass having the stated composition may be mixed with raw batch material stoichiometrically equivalent to mica. In any event, the preferred method described above will be followed once the smelting step is begun as in the smelting step regardless of what the smelting charge is constituted from, the frit formed when the smelted material is poured from the smelter into the quenching tank will be the same and will accordingly, thereafter, be treated the same.

It will also be understood that taeniolite mica and raw batch materials stoichiometrically equivalent to taeniolite mica may be substituted for normal fluor-phlogopite mica and raw batch materials stoichiometrically equivalent to normal fluor-phlogopite mica without departing from the present invention.

While we have herein shown the preferred embodiment of the present invention and have suggested various modifications therein, other changes and modifications may be made therein within the scope of the appended claims without departing from the spirit and scope of this invention.

What we claim is:

1. The method of manufacturing a ceramoplastic material, comprising the steps of mixing lead borate glass forming material consisting essentially of 50% to 92% lead oxide and 50% to 8% boron trioxide with fluor-phlogopite mica forming material, smelting said mixture at a temperature between about 450° C. and 1365° C., quenching the smelt to form a frit, grinding said frit, pressing said ground frit to form a preform, then firing said preform at a temperature between about 800° C. and 1100° C., then cooling said fired preform, whereby to cause mica formed from said mica forming material to precipitate from the glass formed by said glass forming material.

2. The method of manufacturing a ceramoplastic material, comprising the steps of mixing lead borate glass forming material consisting essentially of 50% to 92% lead oxide and 50% to 8% boron trioxide with fluor-phlogopite mica forming material, smelting said mixture at a temperature between about 800° C. and 1200° C., quenching the smelt to form a frit, grinding said frit, pressing said ground frit to form a preform, then firing said preform at a temperature between about 800° C. and 1100° C., then cooling said fired preform, whereby to cause mica formed from said mica forming material to precipitate from the glass formed by said glass forming material.

3. The method of manufacturing a ceramoplastic material, comprising the steps of mixing lead borate glass forming material consisting essentially of about 81.6% lead oxide and 18.4% boron trioxide with normal fluor-phlogopite mica forming material, smelting said mixture at a temperature between about 800° C. and 1200° C., quenching the smelt to form a frit, grinding said frit, pressing said ground frit to form a preform, then firing said preform at a temperature between about 800° C. and 1100° C., then cooling said fired preform, whereby to cause mica formed from said mica forming material to precipitate from the glass formed by said glass forming material.

4. The method of manufacturing a ceramoplastic material, comprising the steps of mixing about 60% of lead borate glass forming material consisting essentially of about 81.6% lead oxide and 18.4% boron trioxide with about 40% normal fluor-phlogopite mica forming material, smelting said mixture at a temperature of about 1200° C., quenching the smelt to form a frit, grinding said frit, pressing said ground frit to form a preform, then firing said preform at a temperature between about 800° C. and 1100° C., then cooling said fired preform, whereby to cause mica formed from said mica forming material to precipitate from the glass formed by said glass forming material.

5. The method of manufacturing a ceramoplastic material, comprising the steps of mixing lead borate frit with normal fluor-phlogopite mica, smelting said mixture at a temperature between about 800° C. and 1200° C., quenching the smelt to form a second frit, grinding said second frit, pressing said ground second frit to form a preform, then firing said preform at a temperature between about 800° C. and 1100° C., then cooling said fired preform, whereby to cause mica to precipitate from said lead borate.

6. The method of manufacturing a ceramoplastic material, comprising the steps of mixing lead borate frit with raw materials which are stoichiometrically equivalent to normal fluor-phlogopite mica, smelting said mixture at a temperature between about 800° C. and 1200° C., quenching the smelt to form a second frit, grinding said second frit, pressing said ground second frit to form a preform, then firing said preform at a temperature between about 800° C. and 1100° C., then cooling said fired preform, whereby to cause mica formed from said raw materials to precipitate from said lead borate.

7. The method of manufacturing a ceramoplastic material, comprising the steps of mixing lead oxide and boron trioxide in the ratio of 81.6% to 18.4% with normal fluor-phlogopite mica, smelting said mixture at a temperature between about 800° C. and 1200° C., quenching the smelt to form a frit, grinding said frit, pressing said ground frit to form a preform, then firing said preform at a temperature between about 800° C. and 1100° C., ten cooling said fired preform, whereby to cause mica to precipitate from the glass formed by said lead oxide and boron trioxide.

8. The method of manufacturing a ceramoplastic material, comprising the steps of mixing lead oxide and boron trioxide in the ratio of 81.6% to 18.4% with raw materials which are stoichiometrically equivalent to normal fluor-phlogopite mica, smelting said mixture at a temperature between about 800° C. and 1200° C., quenching the smelt to form a frit, grinding said frit, pressing said ground frit to form a preform, then firing said preform at a temperature between about 800° C. and 1100° C., then cooling said fired preform, whereby to cause mica to precipitate from the glass formed by said lead oxide and boron trioxide.

9. The method of manufacturing a ceramoplastic material, comprising the steps of mixing lead borate frit with normal fluor-phlogopite mica, smelting said mixture at a temperature of about 1200° C., quenching the smelt to form a second frit, grinding said second frit, pressing said ground second frit to form a preform, then firing said preform at a temperature of about 980° C., then cooling said fired preform, whereby to cause mica to precipitate from said lead borate.

10. The method of manufacturing a ceramoplastic material, comprising the steps of mixing lead borate frit with raw materials which are stoichiometrically equivalent to normal fluor-phlogopite mica, smelting said mixture at a temperature of about 1200° C., quenching the smelt to form a second frit, grinding said frit, pressing said ground second frit to form a preform, then firing said preform at a temperature of about 980° C., then cooling said fired preform, whereby to cause mica formed from said raw materials to precipitate from said lead borate.

11. The method of manufacturing a ceramoplastic material, comprising the steps of mixing lead oxide and boron trioxide in the ratio of 81.6% to 18.4% with normal fluor-phlogopite mica, smelting said mixture at a temperature of about 1200° C., quenching the smelt to form a frit, grinding said frit, pressing said ground frit to form a preform, then firing said preform at a temperature of about 980° C., then cooling said perform, whereby to cause mica to precipiate from the glass formed by said lead oxide and boron trioxide.

12. The method of manufacturing a ceramoplastic material comprising the steps of mixing lead oxide and boron trioxide in the ratio of 81.6% to 18.4% with raw materials which are stoichiometrically equivalent to normal fluor-phlogopite mica, smelting said mixture at a temperature of about 1200° C., quenching the smelt to form a frit, grinding said frit, pressing said ground frit to form a preform, then firing said preform at a temperature of about 980° C., then cooling said fired preform, whereby to cause mica to precipitate from the glass formed by said lead oxide and boron trioxide.

13. The method of manufacturing a ceramoplastic material, comprising the steps of mixing fluor-phlogopite mica forming material in glass forming material consisting essentially of from 50% to 92% lead oxide and 50% to 8% boron trioxide, heating said mixture to a temperature between about 800° C. and 1200° C. to dissolve said mica forming material in said glass forming material, quenching said solution to form a frit, grinding said frit, mixing about 10% to 95% of said frit with about 90% to 5% of crystalline mica, compressing said last mentioned mixture to form a preform, then firing said preform at a temperature between about 800° C. and 1100° C., then cooling said fired preform, whereby to cause mica formed from said mica forming material to precipitate from the glass formed by said glass forming material.

References Cited in the file of this patent

UNITED STATES PATENTS

| Re. 15,727 | Crossley | Dec. 4, 1923 |
| 1,795,200 | Crossley | Mar. 3, 1931 |
| 2,032,239 | Wedlock | Feb. 25, 1936 |
| 2,136,877 | Delpech et al. | Nov. 15, 1938 |

OTHER REFERENCES

BuMines Report (pp. 1 and 2), August 1951, "Information About Synthetic Mica."